United States Patent [19]
Krikorian et al.

[11] Patent Number: 5,594,451
[45] Date of Patent: Jan. 14, 1997

[54] PROCESSING METHOD USING AN ADVANCED RADAR WAVEFORM FOR SIMULTANEOUS MATCHED PROCESSING AND RANGE PROFILING OF DIFFERENT SIZE TARGETS

[75] Inventors: Kapriel V. Krikorian, Agoura; Arnold E. Victor, Marina del Rey, both of Calif.

[73] Assignee: Hughes Aircraft Company

[21] Appl. No.: 466,553

[22] Filed: Jun. 6, 1995

[51] Int. Cl.$^6$ ................................................. G01S 13/53
[52] U.S. Cl. ........................ 342/160; 342/161; 342/162; 342/196; 342/203
[58] Field of Search ........................ 342/195, 196, 342/90, 159, 160, 161, 162, 201, 202, 203

[56] References Cited

U.S. PATENT DOCUMENTS

| | | | |
|---|---|---|---|
| 3,610,901 | 10/1971 | Lynch | 342/196 X |
| 3,745,571 | 7/1973 | Chwastyk et al. | 342/194 |
| 4,071,907 | 1/1978 | Casasent | 364/822 |
| 4,339,754 | 10/1989 | Hammers et al. | 342/89 |
| 4,876,547 | 10/1989 | Franco | 342/160 |
| 4,914,441 | 4/1990 | Brookner | 342/161 |
| 5,229,775 | 7/1993 | Sakamoto et al. | 342/160 |
| 5,422,646 | 6/1995 | Lewis | 342/160 |
| 5,463,399 | 10/1995 | Kretschmer, Jr. | 342/132 |

*Primary Examiner*—John B. Sotomayor
*Attorney, Agent, or Firm*—Leonard A. Alkov; Wanda K. Denson-Low

[57] ABSTRACT

A method of processing radar returns derived from a new radar waveform. The method processes radar returns derived from transmitting the radar waveform to provide simultaneous matched processing and range profiling of different size objects in the presence of clutter. In the present method, radar returns are digitized and processed to produce pulse compressed radar returns having a predetermined (169:1) pulse compression ratio. A pulse to pulse fast Fourier transform on each RF step is performed on the pulse compressed radar returns. The Fourier transformed radar returns are then simultaneously processed by three processing channels, one each for ships, boats and submarines to provide detection of the different size objects. The waveform permits concurrent detection, discrimination, and high resolution range imaging of detected objects within a single dwell, using a single waveform. Thus, a radar search mode using the waveform integrates several search functions without increasing search frame time.

12 Claims, 3 Drawing Sheets

SUBMODE B: PROCESSED RANGE 20-40 NAUTICAL MILES

SUBMODE C: PROCESSED RANGE 40-80 NAUTICAL MILES

SUBMODE D: PROCESSED RANGE 40 NAUTICAL MILES - HORIZON

PROCESSING METHOD USING AN ADVANCED RADAR WAVEFORM FOR SIMULTANEOUS MATCHED PROCESSING AND RANGE PROFILING OF DIFFERENT SIZE TARGETS

BACKGROUND

The present invention relates generally to radar systems, and more particularly, to a method of processing a radar waveform that provides for simultaneous matched processing and range profiling of different size targets.

Conventional radars have heretofore been unable to simultaneously process and display radar returns from multiple targets having different sizes in the presence of clutter. Such would be the case when performing a sea search in an attempt to simultaneously determine the range to surface ships and submarines. Consequently, it would be an improvement to the radar art to have a processing method and radar waveform that permits the simultaneous processing and display radar returns from multiple different size targets in the presence of clutter.

Accordingly, it is an objective of the present invention to provide a method of processing a radar waveform that provides for simultaneous matched processing and range profiling of different size targets. It is a further objective of the present invention to provide a processing method and radar waveform that enhances the performance of air-to-surface radar processing modes to permit detection of small objects.

SUMMARY OF THE INVENTION

To meet the above and other objectives, the present invention is a method that processes radar returns derived from a new radar waveform. The method processes the radar waveform to provide simultaneous matched processing and range profiling of different size objects in the presence of clutter. The waveform permits concurrent detection, discrimination, and high resolution range imaging of detected objects within a single dwell, using a single waveform. Thus a radar search mode using the present invention integrates several search functions without increasing the search frame time.

The method comprises the following steps. Radar signals having a predetermined radar waveform are transmitted. Radar returns from targets are digitized. The digitized radar returns are then pulse compressed. The pulse compressed radar returns on each RF step ere pulse to pulse Fourier transformed. The Fourier transformed radar returns are simultaneously processed by first, second, and third processing channels that correspond to targets of different sizes.

In the first processing channel, the Fourier transformed radar returns are processed by magnitude detecting the Fourier transformed radar returns from each of the RF steps, noncoherently integrating the magnitude detected returns over the RF steps in the waveform, estimating the noise content in the noncoherently integrated returns, thresholding the returns to strip off noise contained therein, coherently integrating the thresholded returns over the dwell time to provide fine Doppler resolution, range profiling the coherently integrated returns, and displaying the range profiled returns. In the second processing channel, the Fourier transformed radar returns are processed by dividing the RF steps into groups, coherently integrating the radar returns within each group of RF steps over the RF steps in the waveform, magnitude detecting the coherently integrated returns, non-coherently integrating the magnitude detected returns over the RF groups in the waveform, estimating the noise content in the noncoherently integrated returns, thresholding the returns to strip off noise contained therein, coherently integrating the thresholded returns over the dwell time to provide fine Doppler resolution, range profiling the coherently integrated returns, and displaying the range profiled returns. In the third processing channel, the Fourier transformed radar returns are processed by coherently integrating the radar returns over the RF steps in the waveform, magnitude detecting the coherently integrated returns, estimating the noise content 23 in the magnitude detected returns, thresholding the returns to strip off noise contained therein, processing the thresholded returns to recognize patterns therein and correlate the patterns to known targets, and displaying the recognized and correlated returns.

The present waveform and processing may be advantageously employed in airborne radars manufactured by the assignee of the present invention and provides efficient utilization of radar energy to achieve multiple simultaneous radar functions matched to different types of targets within a single radar dwell. Thus, the required radar time on target is greatly minimized using the present waveform. This allows the radar to perform additional functions and/or reduce radar radiation to improve its probability of intercept and countermeasures effectiveness.

The present invention significantly improves radar performance, and in particular, air-to-surface processing modes, which may simultaneously detect, discriminate and identify targets in mainlobe and sidelobe clutter using the present waveform and processing. Thus, a sea surface search processing mode provides simultaneous detection and discrimination of periscopes, snorkels, boats, and ships along with high resolution range profiling of boats and ships.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
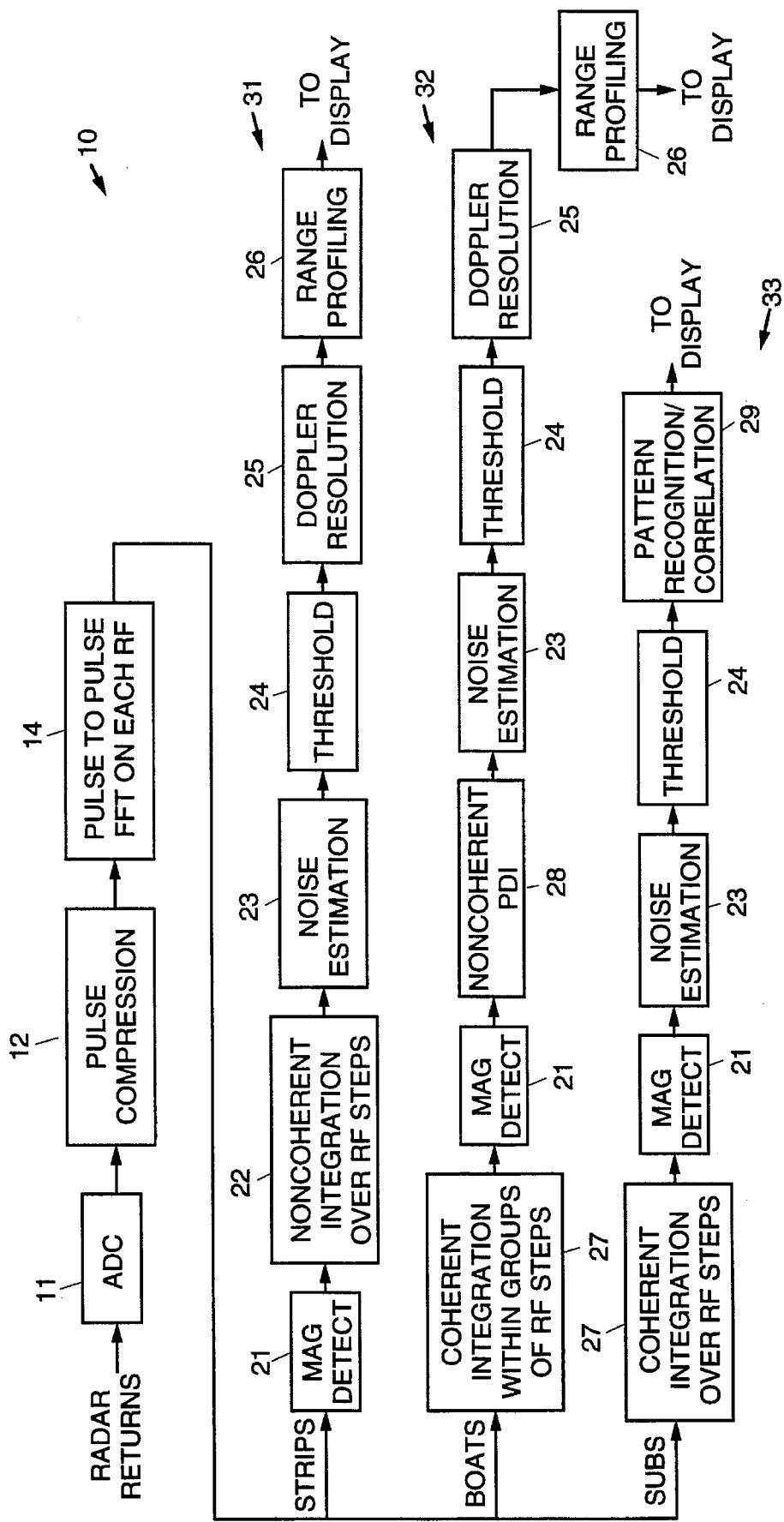
FIG. 1 is a block diagram illustrating an exemplary processing method in accordance with the present invention.

Referring to the drawing figures, FIG. 1 illustrates an exemplary processing method 10 in accordance with the present invention. The processing method 10 is implemented for a 20 nautical mile range scale using an Advanced Sea Surface Search waveform (FIG. 2) in accordance with the present invention and provides simultaneous and matched processing for ships, boats, periscopes and snorkels. Processing throughput requirements for the method 10 were sized to be compatible with the processor in an APG-63U radar manufactured by the assignee of the present invention.

As shown in FIG. 1, radar returns are digitized 11 by an analog to digital converter (ADC) and processed by pulse compression hardware 12 to produce pulse compressed radar returns having a 169:1 pulse compression ratio. A pulse to pulse fast Fourier transform (FFT) 14 on each RF step is performed on the pulse compressed radar returns. The Fourier transformed radar returns are then simultaneously processed by three processing channels 31, 32, 33, one for ships, boats and submarines (SUBS).

In the ship processing channel 31, the Fourier transformed radar returns from each of the RF steps are magnitude detected 21. The magnitude detected returns are noncoherently integrated 22 in the waveform over the RF. The noncoherently integrated returns are then processed 23 to produce an estimate of the noise contained in the returns. The returns are then thresholded 24 to strip off the noise. The thresholded returns are coherently integrated 25 to provide fine Doppler resolution. The coherently integrated, Doppler resolved, returns are then range profiled 26 and displayed to an operator. Doppler resolution processing 25 is performed in a conventional manner such as in coherent pulse Doppler radar mode, for example. Range profiling 26 is performed in a conventional manner, such as in high range resolution real beam map radar modes, for example.

In the boat processing channel 32, the RF steps are divided into groups, the Fourier transformed radar returns from the RF steps are coherently integrated 27 within the groups of RF steps using fast Fourier transforms to provide for fine range resolution. The groups of coherently integrated returns are than magnitude detected 21. The magnitude detected returns are then noncoherently integrated 27 over the RF groups in the waveform. The noncoherently integrated returns are then processed 23 to produce an estimate of the noise contained in the returns. The returns are then thresholded 24. The thresholded returns are coherently integrated 25 to provide fine Doppler resolving. The Doppler resolved returns are then range profiled 26 and displayed to an operator.

In the submarine processing channel 33, the Fourier transformed radar returns from the RF steps are coherently integrated 27 using a fast Fourier transform for ultra-fine range resolution. The coherently processed returns are than magnitude detected 21. The magnitude detected returns are then processed 23 to produce an estimate of the noise contained in the returns. Pattern recognition and correlation 29 of the returns is then performed on the returns to provide discrimination of the target from spiking clutter (sea spikes). The correlated returns are then displayed to an operator. Pattern recognition and correlation 29 is performed in a conventional manner, using conventional image processing techniques, for example.

Figure 2:
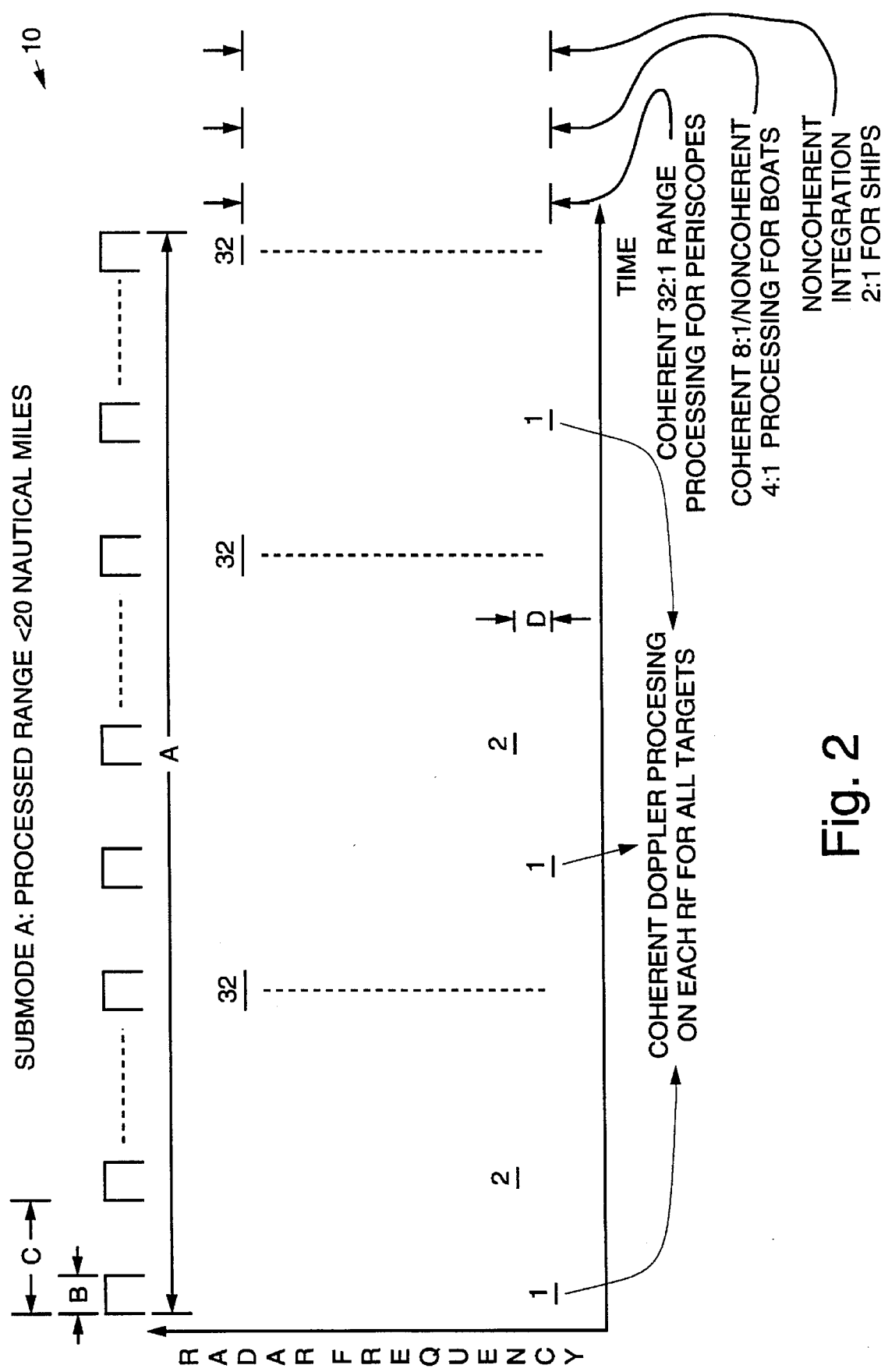
FIG. 2 shows a radar waveform in accordance with the present invention for a 20 nautical mile range scale.

FIG. 2 shows an exemplary radar waveform in accordance with the present invention for a 20 nautical mile range scale. For the purposes of discussion, an example of an advanced waveform for a Sea Surface Search processing mode (method 10) is described below. This processing mode allows for the simultaneous detection and discrimination of periscopes and snorkels to 40 nautical miles, boats to 80 nautical miles in sea state 2 and ships to the horizon (i.e. 123 nautical miles at 10,000 ft altitude) in sea state 5, using an APG-63U radar manufactured by the assignee of the present invention. This processing mode employs a coherent repetitive stepped frequency waveform. The characteristics of this waveform are summarized below:

The coherent repetitive stepped frequency waveform is a high duty factor pulse Doppler waveform that produces high sensitivity. Pulse compression using intrapulse phase coding forms the waveform. The waveform is a low PRF waveform matched to a submode range scale so that there is no eclipsing loss. The waveform provides unambiguous range beyond the horizon using pulse-to-pulse RF agility. A long coherent integration over the dwell time is used to provide fine Doppler resolution. Matched processing is performed within the same dwell time for different target sizes using one waveform. Interpulse coherent frequency stepping is employed to achieve very fine range resolution to detect periscopes. Noncoherent integration over the RF steps in the waveform is used to detect ships. Scan to scan RF agility is also used to decororrelate sea clutter or sea spikes. The scan to scan RF agility is implemented by selecting a different subband within the tunable bandwidth of the radar.

The resolution provided by the method 10 is achieved by coherently combining the stepped frequencies of the waveform. 5.8 MHz pulse-to-pulse frequency stepping may be employed over 32 steps for an overall bandwidth of 160 MHz. The pulse repetition frequency is matched to the maximum range within the radar range scale, but the unambiguous range of the radar is beyond the horizon because of pulse-to-pulse RF stepping. The sequence of steps is repeated over a radar dwell time of 75 msec. Pulse-to-pulse Doppler processing is performed in each RF channel in each coarse range bin (of 50 feet).

Following Doppler processing, noncoherent integration (PDI) over the RF channels is performed for ships. Coherent stepped RF processing for fine range resolution (3.1 feet) for periscopes and snorkels is performed on the Doppler processed data. Doppler filtering on each RF channel provides very fine Doppler resolution, additional discrimination and/or rejection of clutter but is highly ambiguous for fast moving ships and boats. Doppler ambiguity resolution may be performed over the RF frequencies. In addition, the detected ships and boats may be range-profiled at fine resolution within the same dwell by coherently reprocessing the RF frequency steps in the coarse range bins of interest.

Use of a similar waveform requires no modification to the hardware or processor of an APG-63U radar. Modified versions of the processing method may be employed in processors of other radars manufactured by the assignee of the present invention.

The processing method 10 using the waveform may operate at four different range scales (<20 nautical miles, 20–40 nautical miles, 40–80 nautical miles, and 80–160 nautical miles). Pulse compression (169:1) is applied to achieve a higher duty factor and range resolutions of approximately 50 feet for ranges less than 80 nautical miles and 300 feet beyond 80 nautical miles. These resolutions are acceptably well-matched to ships but not adequately matched for periscopes, snorkels and small boats. Coherent combination over stepped frequencies within each coarse range bin is used to detect the smaller targets and maximize range performance. The finest resolution of 2.7 feet is employed in the region where periscopes and snorkels are to be detected.

FIG. 2 shows the waveform of the present invention that may be used for the matched detection of periscopes and snorkels, boats and ships for a 20 nautical mile range scale. In FIG. 2, dimension "A" is 75 milliseconds, dimension "B" is 17.4 microseconds, with a pulse compression ratio of 169:1, dimension "C" is 293 microseconds and dimension "D" is a frequency of 5.0 MHz. Targets are represented by numbers in the graph which are processed by coherent Doppler processing.

Figure 3:
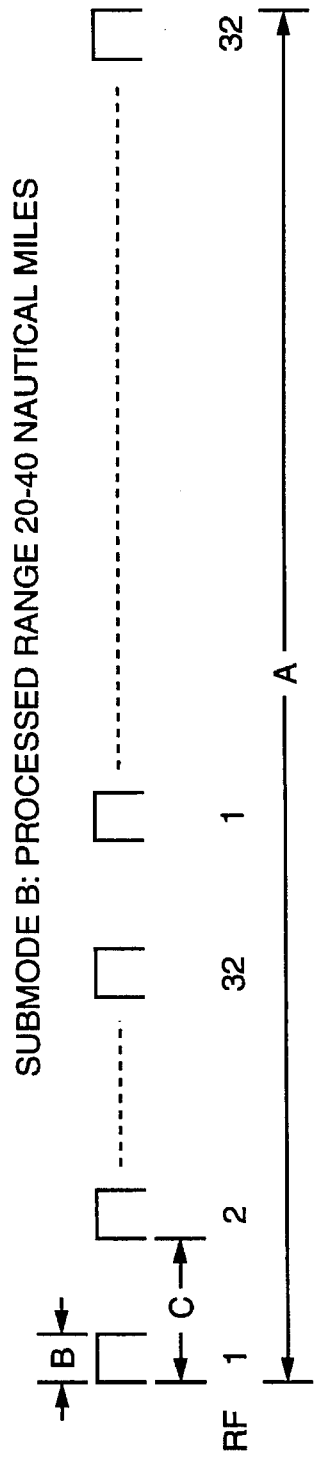
FIGS. 3-5 show radar waveforms in accordance with the present invention for 40, 80, and 160 nautical mile range scales, respectively.
Figure 4:
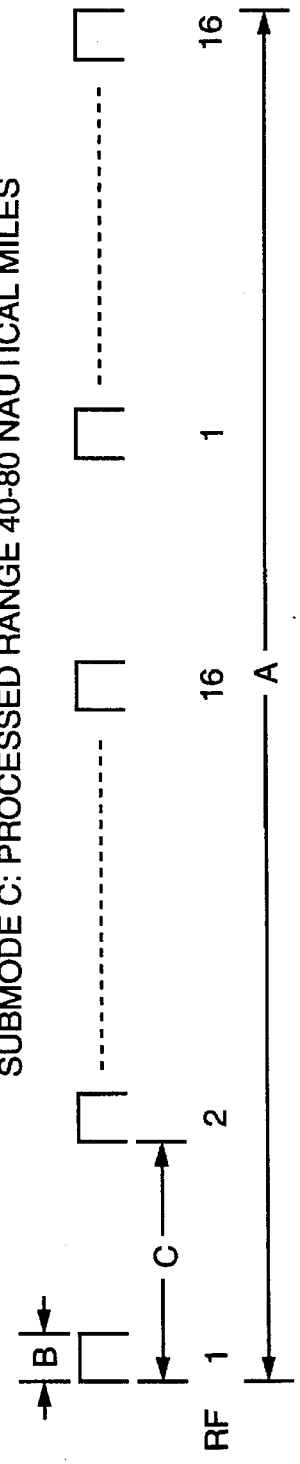
Figure 5:
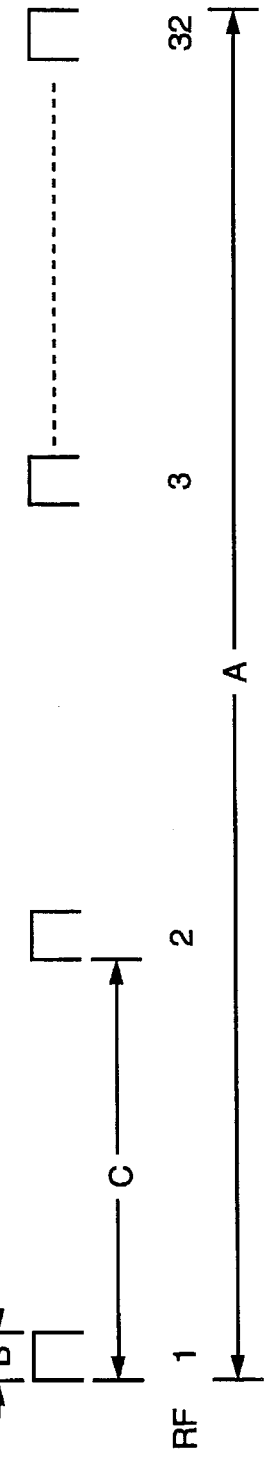

Waveforms for 40, 80 and 160 nautical mile range scales are illustrated in FIGS. 3–5. In FIG. 3, dimension "A" is 75 milliseconds, dimension "B" is 17.4 µseconds, with a pulse compression ratio of 169:1, and dimension "C" is 586 μseconds. In FIG. 4, dimension "A" is 75 milliseconds, dimension "B" is 17.4 μseconds, with a pulse compression ratio of 169:1, and dimension "C" is 1172 μseconds. In FIG. 5, dimension "A" is 75 milliseconds, dimension "B" is 100 μseconds, with a pulse compression ratio of 169:1, and dimension "C" is 1563 μseconds.

Table 1 is an example of parameters of an advanced Sea Surface Search waveform in accordance with the present invention and summarizes the waveform parameters for the different range scales. The dynamic range of the analog to digital converter (ADC) used to produce the data in Table 1 was 11 bits.

TABLE 1

| SUBMODE | A | B | C | D |
|---|---|---|---|---|
| Range | 20 | 40 | 80 | 160 |
| Processed range, nautical miles | <20 | 20–40 | 40–80 | 80–160 |
| Pulse compression ratio | 169 | 169 | 169 | 169 |
| Transmitted pulsewidth, μsec | 17.4 | 17.4 | 17.4 | 100 |
| Compressed pulsewidth, nsec | 103 | 103 | 103 | 592 |
| Coarse range bin size, feet | 50 | 50 | 50 | 300 |
| Number of coarse range bins | 2430 | 2430 | 4860 | 3360 |
| Target dwell time, msec | 75 | 75 | 75 | 75 |
| PRF, pps | 3416 | 1708 | 854 | 640 |
| Number of PRI's | 256 | 128 | 64 | 48 |

Table 2 shows parameters of matched simultaneous processing for the Advanced Sea Surface Search waveform of the present invention. The 3.1 foot range resolution for a typical azimuth beamwidth of 2.0 degrees allows for the rejection of background clutter and is matched to the size of periscopes and snorkels. The data in Table 2 is ambiguous within the coarse range bin (<6 ambiguities).

TABLE 2

| SUBMODE | A | B | C | D |
|---|---|---|---|---|
| Number of pulse repetition intervals | 256 | 128 | 64 | 48 |
| Doppler processing: | | | | |
| Number of filters | 8 | 4 | 4 | 16 |
| Velocity resolution, fps | 0.7 | 0.7 | 0.7 | 0.7 |
| Range processing: | | | | |
| Number of frequency steps | 32 | 32 | 16 | 3 |
| Frequency step, MHz | 5.0 | 5.0 | 5.0 | — |
| Submarines: | | | | |
| Number of frequency steps | 32 | 32 | 16 | — |
| Coherent bandwidth, MHz | 160 | 160 | 80 | — |
| Range resolution, feet | 3.1 | 3.1 | 6.2 | — |
| Boats: | | | | |
| No. of freq. steps/noncoherent integrations | 8/4 | 8/4 | 8/2 | — |
| Coherent bandwidth, MHz | 40 | 40 | 40 | — |
| Range resolution, feet | 12.4 | 12.4 | 12.4 | — |
| Ships: | | | | |
| Number of noncoherent integrations | 32 | 32 | 16 | 3 |
| Coherent bandwidth, MHz | 10 | 10 | 10 | 1.7 |
| Range resolution, feet | 50 | 50 | 50 | 300 |

Thus, a radar waveform and processing method that enhances the performance of air-to-surface radar processing modes to permit detection of small objects have been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A method of processing radar returns derived from a predetermined radar waveform that permits simultaneous match processing and profiling of different size targets, said method comprising the steps of:

transmitting radar signals having a predetermined radar waveform;

digitizing radar returns from targets;

pulse compressing the digitized radar returns;

pulse to pulse Fourier transforming the pulse compressed radar returns on each RF step;

simultaneously processing the Fourier transformed radar returns by first, second, and third processing channels that correspond to targets of different sizes; and wherein:

in the first processing channel, the Fourier transformed radar returns are processed by:

magnitude detecting the Fourier transformed radar returns from each of the RF steps;

noncoherently integrating the magnitude detected returns over the RF steps in the waveform;

estimating the noise content in the noncoherently integrated returns;

thresholding the returns to strip off noise contained therein;

coherently integrating the thresholded returns over the dwell time to provide fine Doppler resolution;

range profiling the coherently integrated returns; and displaying the range profiled returns;

in the second processing channel, the Fourier transformed radar returns are processed by:

dividing the RF steps into groups;

coherently integrating the radar returns within each group of RF steps over the RF steps in the waveform;

magnitude detecting the coherently integrated returns;

noncoherently integrating the magnitude detected returns over the RF groups in the waveform;

estimating the noise content in the noncoherently integrated returns;

thresholding the returns to strip off noise contained therein;

coherently integrating the thresholded returns over the dwell time to provide fine Doppler resolution;

range profiling the coherently integrated returns; and displaying the range profiled returns; and in the third processing channel, the Fourier transformed radar returns are processed by:

coherently integrating the radar returns over the RF steps in the waveform;

magnitude detecting the coherently integrated returns;

estimating the noise content 23 in the magnitude detected returns;

thresholding the returns to strip off noise contained therein;

processing the thresholded returns to recognize patterns therein and correlate the patterns to known targets; and displaying the recognized and correlated returns.

2. The method of claim 1 wherein the step of pulse compressing the digitized radar returns comprises pulse compressing the digitized radar returns to produce pulse compressed radar returns having a pulse compression ratio of about 169:1.

3. The method of claim 1 wherein the waveform comprises a coherent repetitive stepped frequency waveform.

4. The method of claim 3 wherein the waveform comprises a high duty factor pulse Doppler waveform.

5. The method of claim 1 wherein pulse compression using intrapulse phase coding forms the waveform.

6. The method of claim 1 wherein the waveform is a low PRF waveform matched to a submode range scale to minimize eclipsing loss.

7. The method of claim 1 wherein pulse-to-pulse RF agility using the waveform provides unambiguous range beyond the horizon.

8. The method of claim 1 wherein a long coherent integration over the dwell time is used to provide fine Doppler resolution.

9. The method of claim 1 wherein matched processing is performed within the same dwell time for different target sizes using the waveform.

10. The method of claim 1 wherein interpulse coherent frequency stepping is employed to achieve very fine range resolution to detect periscopes.

11. The method of claim 1 wherein noncoherent integration over the RF steps in the waveform is used to detect ships.

12. The method of claim 1 wherein a different subband within the tunable bandwidth of the radar is used to implement scan to scan RF agility to decorrelate sea clutter and sea spikes.

* * * * *